J. H. PERRY.
TIRE.
APPLICATION FILED MAY 5, 1920.

1,413,872. Patented Apr. 25, 1922.

John Henry Perry, INVENTOR.

BY

Richard B. Owen, ATTORNEY.

UNITED STATES PATENT OFFICE.

JOHN HENRY PERRY, OF MIDDLETOWN, NEW YORK.

TIRE.

1,413,872. Specification of Letters Patent. Patented Apr. 25, 1922.

Application filed May 5, 1920. Serial No. 379,131.

*To all whom it may concern:*

Be it known that I, JOHN HENRY PERRY, a citizen of the United States, residing at Middletown, in the county of Orange and State of New York, have invented certain new and useful Improvements in Tires, of which the following is a specification.

The present invention contemplates the substitution of a tubular spring element for the ordinary inner tube of a tire so as to eliminate punctures and blow outs usually connected with the use of the inner tube.

A further object of the invention is to provide a resilient cushioning means which can be easily encased within the outer shoe or tire casing either as a permanent replacement for the inner tube or merely as an emergency device in case the supply of inner tubes becomes exhausted after several blow outs, etc.

With these and other objects in view, the invention may be said generally to reside in the details of construction and combination of parts as will be hereinafter more fully pointed out, reference being had to the accompanying drawings wherein—

Figure 1:
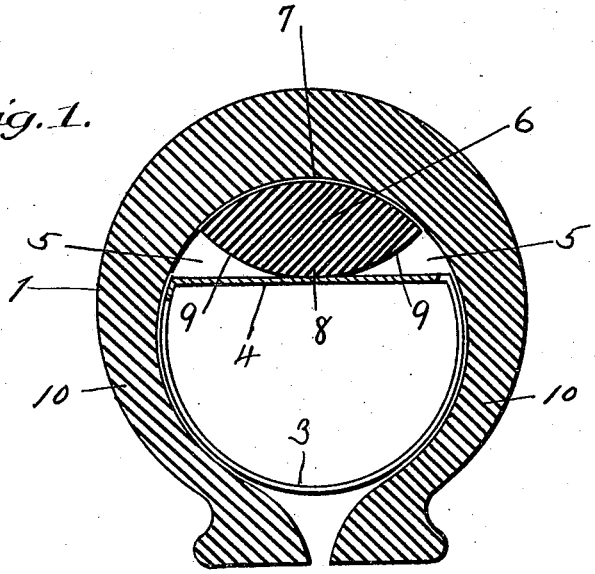
Figure 2:
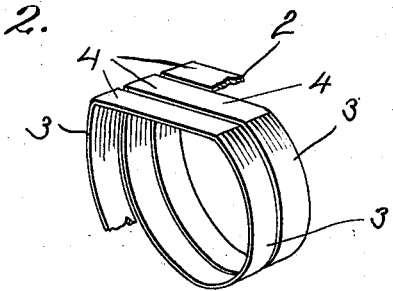

Figure 1 is a transverse sectional view of a tire constructed in accordance with the invention, and Figure 2 is a fragmentary view in perspective of the tubular spring or cushion.

In the drawing 1 indicates the tire shoe or casing of the usual shape and size and it is the purpose of the present invention to associate with said shoe an inner cushioning element which is adapted to take the place of an ordinary inner air tube usually encased within the casing.

The cushioning means consists of two parts, the first being a tubular coiled spring formed from a strip 2 of resilient material, either round or flat in cross section, it merely being necessary that it have sufficient resilient strength to stand up well under the shocks and jars incident to the traveling of the vehicle with which the tire is used. For purposes of convenience the resilient strip is shown as being of a flat narrow width and in some cases this construction might be preferable since it provides each coil with a broad bearing surface. This strip 2 is coiled to provide a plurality of convolutions of uniform diameter extending throughout the length of the strip and forming it into an endless coiled spring formed of the individual coils 3 which extend in endless progression providing an annular ring adapted to be encased within the shoe 1, with the coils expanding outwardly against the sides of the shoe. Each coil 3 is slightly spaced from the adjacent coils so that each one is permitted a certain amount of free individual contraction or expansion. Each coil instead of forming a complete circle is provided at its top with a flat bridging portion 4, the bridging portions of all the coils being in alignment so as to provide a cushioning structure in the form of a tubular spring having a flat top or tread portion. This tubular spring is designed to be inserted within the shoe 1 so that the flat tread 4 is positioned an appreciable distance below the upper encircling wall of the shoe thus providing a suitable space 5 for the accommodation of the second part of the cushioning means, namely the buffer strip 6 which is adapted to provide a reinforcement for the tread of the tire.

This buffer 6 comprises a strip or ring of solid rubber or other resilient and flexible material and is designed to extend entirely around the tire and between the flat surface 4 of the tubular spring and the inner wall 7 of the shoe. This strip, as will be seen from a consideration of Fig. 1 of the drawings is elliptical in cross section and is adapted to have its entire convexed upper surface snugly engaging the inner wall of the shoe, while the opposite convexed surface has a supporting contact with the flat surface 4 of the tubular spring only at one particular point and that being at its lowermost portion as indicated at 8. Due to the curvature of the buffer strip 6 it will be noted that the space 5 exists on both sides of the strip and between its side edges 9 and the adjacent ends of the flat treads of the respective coils of the spring, thus permitting the strip to expand at the sides when contracted between the wall 7 and the tubular spring by the pressure exerted upon the tread of the tire. The tubular spring by reason of the resilient expansion of its coils tends to keep the strip firmly in engagement with the top of the tire and to hold it rigidly in a central position upon the surface of the spring without any chance to slip or shift its position during the use of the tire.

The coils of the spring tends to keep the side walls 10 of the shoe expanded outwardly the same as the ordinary air tube would tend to do, thus insuring that the shoe will obtain a firm grip upon the rim of the wheel to which it may be clamped, and since each coil extends substantially over more than half of the circumference of the tire upon the inside, the same will be kept as fully and as solidly inflated by the resilient expanding action of the coiled spring as it would be if pumped with air and the buffer strip 6 not only provides a reinforcement for the tread of the shoe but normally tends to keep the tread extended solidly outward, being urged uniformly against every part of the tire which it covers on the inside by the outwardly expanding force of the individual bridge portions 4 of each coil which as has been already seen support the solid flexible strip. The tubular spring and the buffer strip thus perform the functions of the inner tube without being subjected to the same difficulties and dangers with respect to punctures, blow outs, etc.

In operation, the cushioning device would be inserted within the tire shoe 1 and positioned as illustrated in Figure 1 with the buffer strip 6 circumferentially supported upon the flat surface 4 of the spring so as to be held firmly against the top wall of the tire shoe upon the inside. The shocks and jars are taken up and absorbed by each individual coil of the tubular spring which are of course capable of independent expansion or contraction whenever any force is directly applied thereto. The brunt and strain of the contact of the tire is of course first borne by the tread portion of the shoe and in the present device the elliptical shaped buffer strip not only reinforces the tread of the shoe at the point where the contact falls heaviest, but owing to its resilient nature, tends to absorb much of the force of the shock, while the flat surface of the spring upon which it is supported enables it to give slightly rather than to offer a stiff resistance. The capacity of the rubber strip and the coils of the spring to take up and absorb the force of all shocks is what constitutes the advantage over the inner tube, in that a sudden strain placed abruptly upon the tire, even though successfully resisted by the inner air tube, may yet result in the blow out of the casing at its weakest portion, namely, at the thin portions of its sides, which are unable to withstand the pressure. The coils of the spring are however capable of contracting or expanding in accordance with the movement of the shoe and would ordinarily remain snugly engaged with the side walls of the shoe so as to, as a matter of fact, provide a sort of reinforcement therefor, while the bridge portions of the coils provide a yieldable seat for the buffer strip which enables the latter to give way slightly under any pressure applied directly or indirectly to any portion of the tread of the tire shoe.

With a resilient inner cushioning means as herein provided a tire is substantially immune from punctures and blow outs and an additional advantage resides in the fact that where it would be dangerous to use an inner tube with a partially worn casing, a device of the character here described would be most suitable and appropriate and would thus enable one to get almost double wear out of tires, since it would enable worn casings to be put to further service although such casings might possibly be so worn out as to render it dangerous to use them with an inner tube. Although the foregoing may be said to refer to the preferred embodiment of the invention it is to be understood that minor changes in the details of construction, arrangement of parts, etc., may be resorted to as fall within the scope of the invention claimed.

Having thus described my invention what I claim as new and desire to secure by Letters Patent is:—

1. In a resilient tire, a casing, a spirally coiled strip forming a ring within the casing for giving shape thereto, and an annular cushioning element encircling the ring and engaging the casing, said element bearing against the said ring only at the center thereof whereby expansion spaces are provided on opposite sides of the bearing point.

2. A resilient tire comprising a casing, a spirally coiled strip forming a ring within the casing for giving shape thereto, said ring having its coils flattened to provide a flat bearing surface adjacent the tread-wall of the casing, and an annular buffer strip of resilient material encircling said ring with its outer portion snugly engaging the tread of the casing on the inside and its inner portion convex and supported on the flat bearing portion of the said ring, said ring having the coils spaced and tensioned to expand laterally against the side walls of the casing and outwardly against the strip for cushioning the tire against shocks and jars.

3. In a tire, a casing, an endless ring of coils, each having a flattened portion, enclosed within the inner half of the casing with the flattened portions forming a flat bearing surface inwardly of the tread-wall of the casing, and an annular buffer strip of elliptical cross section encircling the ring about its flat surface and fitting snugly against the tread-wall of the casing, said strip having one of its convex surfaces resting upon the flat portions of the coils whereby it is yieldably supported in place.

4. A resilient tire comprising a tire shoe and a filler therefor, comprising annular, yieldable, members enclosed within said shoe and respectively disposed against opposite walls of the shoe for giving shape to the tire and in contact at their inner adjacent faces, the contacting face of one member being curved and the contacting face of the other member being flat whereby one member may yield with respect to the other.

In testimony whereof I affix my signature in presence of two witnesses.

JOHN HENRY PERRY.

Witnesses:
 MAUDE L. SWEENEY,
 JOHN J. SWEENEY.